(12) United States Patent
Hsu et al.

(10) Patent No.: US 9,658,725 B2
(45) Date of Patent: May 23, 2017

(54) TOUCH PANEL AND TOUCH DISPLAY DEVICE

(71) Applicant: InnoLux Corporation, Miao-Li County (TW)

(72) Inventors: Wei-Ting Hsu, Miao-Li County (TW); Hui-Wen Teng, Miao-Li County (TW); Chih-Chang Chen, Miao-Li County (TW); Ping-Hsu Cheng, Miao-Li County (TW); Guang-Ying Zeng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 56 days.

(21) Appl. No.: 14/687,113

(22) Filed: Apr. 15, 2015

(65) Prior Publication Data

US 2015/0309605 A1    Oct. 29, 2015

(30) Foreign Application Priority Data

Apr. 25, 2014    (TW) .............................. 103114931 A

(51) Int. Cl.
*G06F 3/044*    (2006.01)
(52) U.S. Cl.
CPC .... *G06F 3/044* (2013.01); *G06F 2203/04103* (2013.01); *G06F 2203/04111* (2013.01)
(58) Field of Classification Search
CPC ........... G06F 3/044; G06F 2203/04103; G06F 2203/04111
See application file for complete search history.

(56) References Cited

U.S. PATENT DOCUMENTS

| 9,075,485 B2 | 7/2015 | Tsai et al. |
| 2011/0316810 A1* | 12/2011 | Tsujino ............... G02F 1/13338 345/174 |

(Continued)

FOREIGN PATENT DOCUMENTS

| TW | 201120506 | 6/2011 |
| TW | 201331669 | 8/2013 |

OTHER PUBLICATIONS

Chinese language office action dated Dec. 28, 2015, issued in application No. TW 103114931.

*Primary Examiner* — Tom Sheng
(74) *Attorney, Agent, or Firm* — McClure, Qualey & Rodack, LLP

(57) ABSTRACT

The disclosure provides a touch panel. The touch panel includes a substrate which includes a visible region and a border region outside the visible region. The touch panel also includes a shielding layer disposed over the border region of the substrate. The touch panel also includes a sensing electrode layer disposed over the substrate, and the sensing electrode layer extends from the visible region to the border region. The sensing electrode layer includes a plurality of first electrodes, and each of the first electrodes includes a plurality of first electrode pads arranged along a first direction and electrically connected to each other. The sensing electrode layer also includes a plurality of second electrodes, and each of the second electrodes includes a plurality of second electrode pads arranged along a second direction. The sensing electrode layer also includes a plurality of bridge portions across the first electrodes for electrically connecting the adjacent second electrode pads, and the bridge portions comprise a plurality of first bridge parts disposed above the border region.

17 Claims, 8 Drawing Sheets

(56) References Cited

U.S. PATENT DOCUMENTS

| | | | |
|---|---|---|---|
| 2014/0333556 A1* | 11/2014 | Lin | G06F 3/041 345/173 |
| 2015/0062454 A1* | 3/2015 | Hao | G06F 3/044 349/12 |
| 2015/0062455 A1* | 3/2015 | Hao | G06F 3/044 349/12 |
| 2015/0185910 A1* | 7/2015 | Zhang | G02F 1/13338 345/174 |

* cited by examiner

TOUCH PANEL AND TOUCH DISPLAY DEVICE

CROSS REFERENCE TO RELATED APPLICATIONS

This Application claims priority of Taiwan Patent Application No. 103114931, filed on Apr. 25, 2014, the entirety of which is incorporated by reference herein.

BACKGROUND

Field of the Disclosure

The present disclosure relates to a display panel, and in particular, it relates to a touch panel and a touch display device.

Description of the Related Art

Consumer electronic applications are becoming increasingly diverse with the rapid progress of science and technology. Many electronic products are light, thin, short and small. Moreover, touch panels are widely used in various portable electronic products, (such as personal digital assistants (PDA) and mobile phones).

Conventionally, touch panels and display panels are fabricated separately and then assembled together to form a touch display device. The touch panels are classified into resistive touch panels, capacitive touch panels, surface acoustic wave touch panels, and optical touch panels. The capacitive-type touch panel is further classified into a surface capacitive type and a projective capacitive type.

However, for the conventional touch panel, the visible region has touch functionality, and the border region does not. Thus, the sensitivity of the touch panel is limited. Accordingly, there is a need to develop a touch panel that improves upon the sensitivity of the touch panel.

BRIEF SUMMARY

The disclosure provides a touch panel. The touch panel includes a substrate which includes a visible region and a border region outside the visible region. The touch panel also includes a shielding layer disposed over the border region of the substrate. The touch panel also includes a sensing electrode layer disposed over the substrate, and the sensing electrode layer extends from the visible region to the border region. The sensing electrode layer includes a plurality of first electrodes, and each of the first electrodes includes a plurality of first electrode pads arranged along a first direction and electrically connected to each other. The sensing electrode layer also includes a plurality of second electrodes, and each of the second electrodes includes a plurality of second electrode pads arranged along a second direction. The sensing electrode layer also includes a plurality of bridge portions across the first electrodes for electrically connecting the adjacent second electrode pads, wherein the bridge portions comprise a plurality of first bridge parts disposed above the border region.

The disclosure provides a touch display device. The touch display device includes a display element and a touch panel of the disclosure on the display element.

The disclosure provides a touch display device. The touch display device includes a display element and a touch panel of the disclosure disposed within the display element.

A detailed description is given in the following embodiments with reference to the accompanying drawings.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

The present disclosure is best understood from the following detailed description when read with the accompanying figures. Like reference numbers in the figures refer to like components. It should be emphasized that, in accordance with the standard practice in the industry, various features are not drawn to scale and are used for illustration purposes only. In fact, the relative dimensions of the various features may be arbitrarily increased or reduced for clarity of discussion. Moreover, the elements in the figures are described in the specification. Figures and the discussion below illustrate simplified structures so as to not obscure various features and to omit redundant features that would be apparent to a person of ordinary skill in the art. The specific embodiments discussed are merely illustrative of specific ways to make and use the various embodiments, and do not limit the scope of the specification, or the appended claims.

Figure 1:
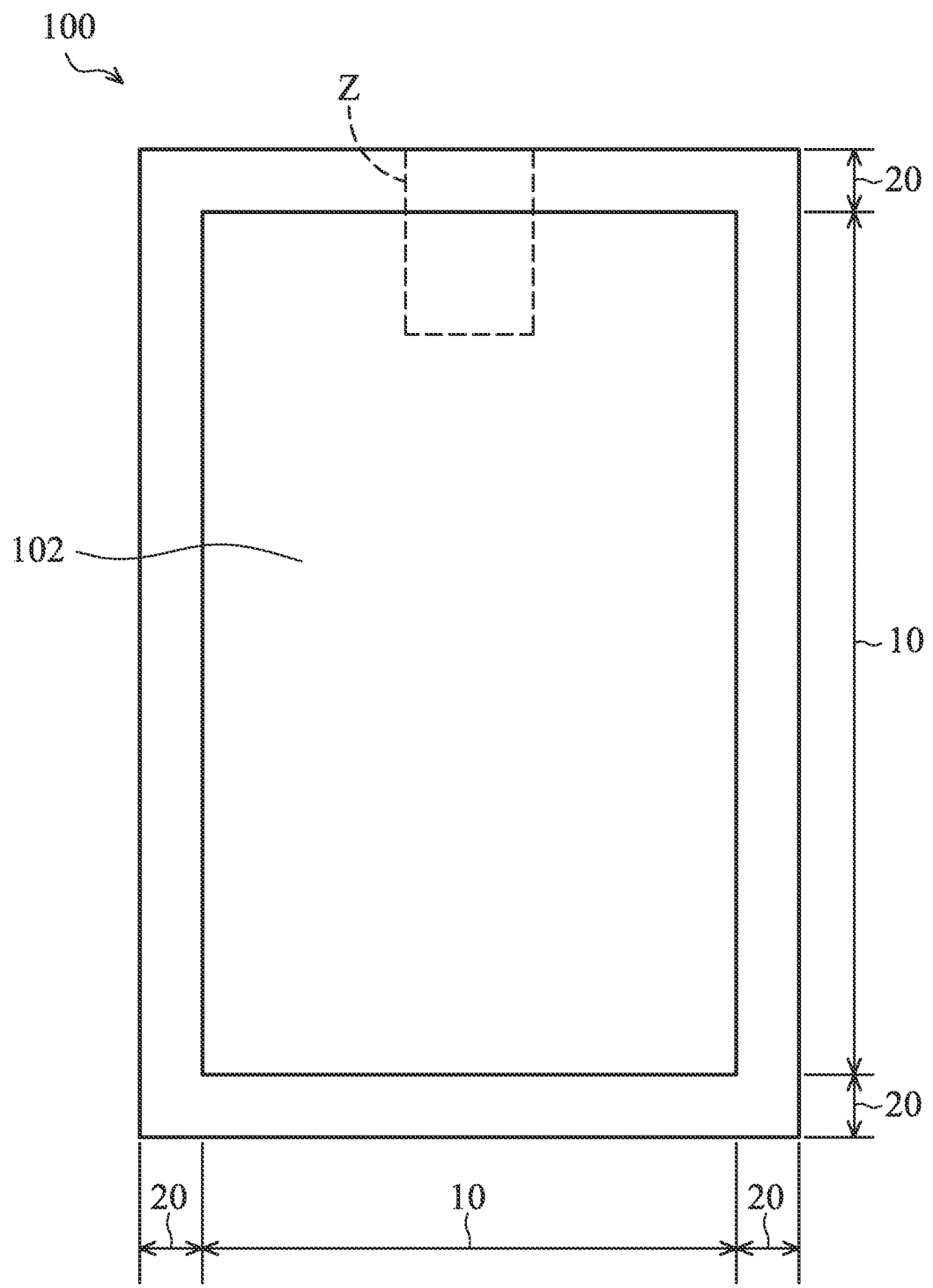
FIG. 1 shows a top-view of a touch panel in accordance with one embodiment of the disclosure.

The disclosure provides a touch panel and a touch display device. FIG. 1 shows a top-view of a touch panel 100 in accordance with one embodiment of the disclosure. The touch panel 100 includes a substrate 102. The substrate 102 includes a visible region 10 and a border region 20. The visible region 10 is a transparent region for displaying the image. The border region 20 is a non-visible region outside the visible region 10. The touch panel 100 includes a shielding layer 130 (shown in FIG. 3). The shielding layer 130 is disposed over the substrate 102 to provide the substrate 102 with a black border.

The substrate 102 is made of a transparent material including polyethyleneterephthalate (PET), polyether sulfone (PES), polyacrylate (PAR), polyethylene naphthalate (PEN), poly(phenylene sulphide) (PPS), polyallylate, polycarbonate (PC) or the like. In some embodiments, the substrate 102 is a rigid substrate or a flexible substrate. In some embodiments, the substrate 102 has a planar shape, while in other embodiments, the substrate may have a curved shape or other irregular shapes.

Figure 2:
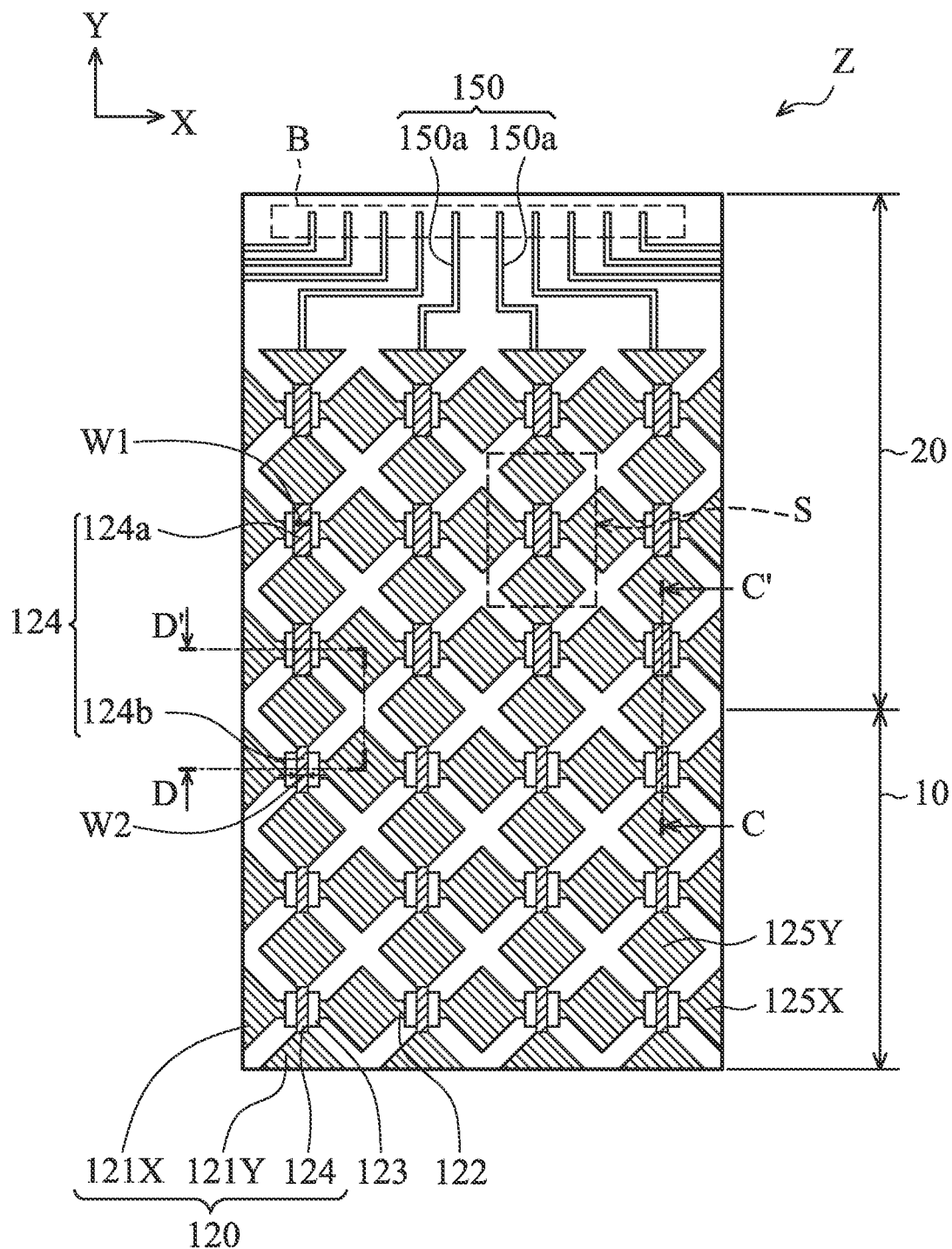
FIG. 2 shows a top-view of the region Z of FIG. 1.

FIG. 2 shows a top-view of the region Z of FIG. 1. The touch panel 100 includes a sensing electrode layer 120 disposed over the substrate 102. The sensing electrode layer 120 is extended from the visible region 10 to the border region 20 (referring to FIG. 3C). The sensing electrode layer 120 includes a plurality of first electrodes 121X, a plurality of second electrodes 121Y and a plurality of bridge portions 124. Each of the first electrodes 121X includes a plurality of first electrode pads 125X. The first electrode pads 125X are arranged along a first direction (for example, the X-axis) and electrically connected to each other. The second electrodes 121Y include a plurality of second electrode pads 125Y. The second electrode pads 125Y are arranged along a second direction (for example, the Y-axis). The first direction is not parallel to the second direction. The adjacent second electrode pads 125Y are electrically connected to each other by the bridge portions 124. The sensing electrode layer 120 also includes a plurality of connecting lines 122 for electrically connecting the adjacent first electrode pads 125X. The bridge portions 124 include a first bridge part 124a disposed above the border region 20 and a second bridge part 124b formed in the visible region 10. The bridge portions 124 cross the first electrodes 121X for electrically connecting the adjacent second electrode pads 125Y.

In some embodiments, the material of the first electrodes 121X or the second electrodes 121Y is a transparent material, such as indium tin oxide (ITO), indium zinc oxide (IZO), cadmium tin oxide (CTO), aluminum zinc oxide (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or a combination thereof.

In some embodiments, the material of the bridge portions 124 may include a conductive metal line, a transparent conductive material or a combination thereof. Examples of suitable conductive metal lines include, but are not limited to, copper (Cu), silver (Ag), aluminum (Al) or combinations thereof. Examples of suitable transparent conductive materials include, but are not limited to, indium tin oxide (ITO), indium zinc oxide (IZO), cadmium tin oxide (CTO), aluminum zinc oxide (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or combinations thereof. In another embodiment, the first bridge part 124a in the border region 20 is made of a conductive metal line, and the second bridge part 124b in the visible region 10 is made of a transparent conductive material.

Figure 3A:
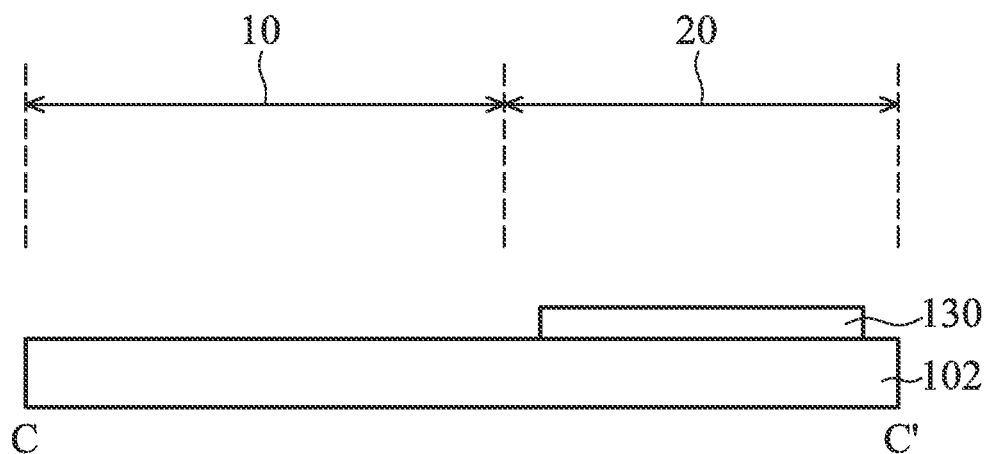
FIGS. 3A-3C show cross-sectional views of various stages of forming a touch panel in accordance with one embodiment of the disclosure.
Figure 3B:
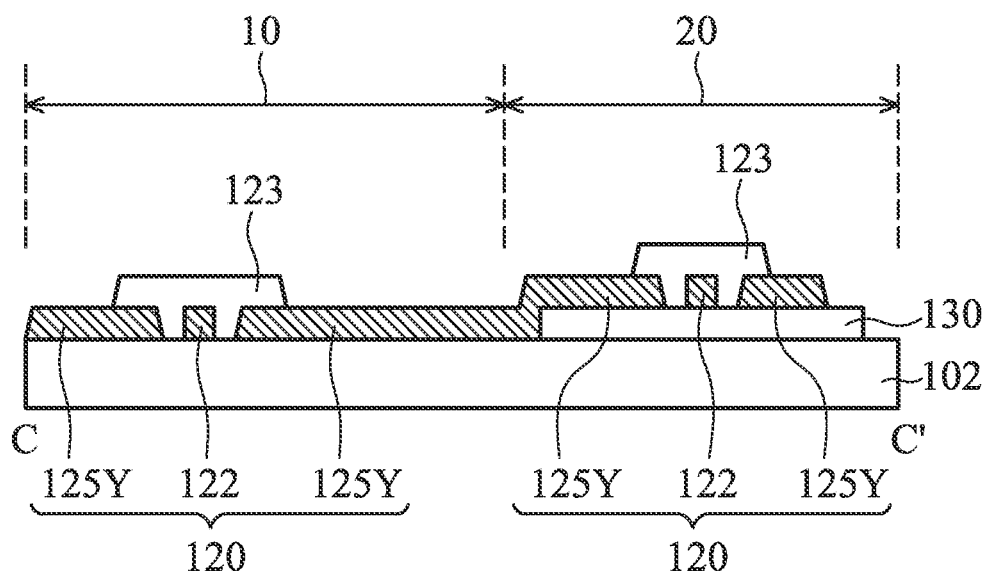
Figure 3C:
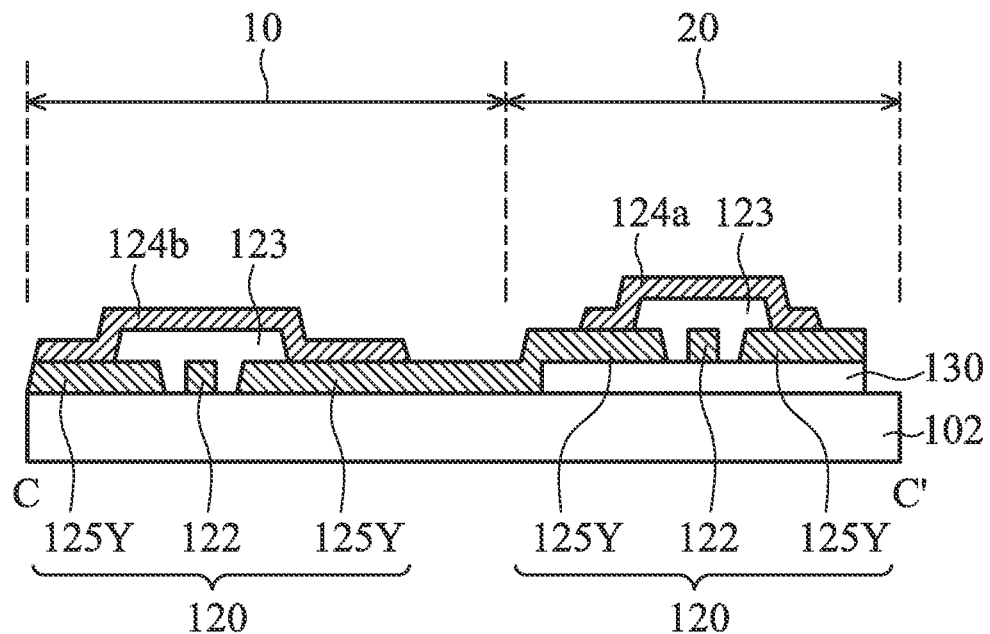

In addition, an insulating layer 123 is disposed between the first electrodes 121X and the bridge portions 124 (referring to FIG. 3C). In some embodiments, the insulating layer 123 is made of organic insulating material or inorganic insulating material, such as polyimide, epoxy, and so forth.

It should be noted that, in the conventional art, no sensing electrode layer 120 is formed in the border region 20. Therefore, only the visible region 10 has touch functionality. The sensing electrode layer 120 of the disclosure extends from the visible region 10 to and on the shielding layer 130 of the border region 20. Therefore, in addition to the visible region 10, the border region 20 also has touch functionality. Compared with the prior art, the touch panel of this disclosure can also perform the touch functionality in the border region 20. As a result, the touch panel of this disclosure has sensitivity higher than the conventional touch panel.

Referring to FIG. 2 again, the touch panel 100 includes a signal wiring layer 150 disposed above the border region 20 and disposed above the shielding layer 130. The signal wiring layer 150 includes a plurality of signal wires 150a. One end of each of the signal wires 150a is electrically connected to the sensing electrode layer 120, and the other end is connected to a driver integrated circuit (IC, not shown) to form bonding regions B. The signal wires 150a are insulated from each other. It should be noted that the number and location of the bonding regions B may be adjusted according to the shape and size of the sensing electrode layer 120 and the number of signal wires 150a, but is not limited to the disclosed embodiments.

FIGS. 3A-3C show cross-sectional views of various stages of forming a touch panel in accordance with one embodiment of the disclosure. FIGS. 3A-3C show cross-sectional views along line C-C' of FIG. 2.

Referring to FIG. 3A, the substrate 102 is provided first. The shielding layer 130 is disposed over the substrate 102. More specifically, the shielding layer 130 is formed in the border region 20. In some embodiments, the shielding layer 130 is a color photoresist made of resin, pigment, photosensitive agent and solvents. In some embodiments, the shielding layer 130 includes black photoresist materials, such as polyimide or ink. In some embodiments, the shielding layer is formed by a deposition process, such as physical vapor deposition (PVD), chemical vapor deposition (CVD), spin-on process or other suitable processes.

Referring to FIG. 3B, after forming the shielding layer 130, the sensing electrode layer 120 is disposed over the substrate 102 and the shielding layer 130. The sensing electrode layer 120 includes a plurality of first electrodes 121X, and a plurality of second electrodes 121Y. The first electrodes 121X include a plurality of first electrode pads 125X arranged along the first direction (such as X-axis). The first electrodes 121X include a plurality of connecting lines 122 for electrically connecting the adjacent first electrode pads 125X. The second electrodes 121Y include a plurality of second electrode pads 125Y arranged along the second direction (such as Y-axis). The materials of the sensing electrode layer 120 have been described above, and will not be repeated here for brevity.

In some embodiments, the metal materials are formed by a deposition process, and then subject to a photolithography patterning and etching processes to form the sensing electrode layer 120. The deposition process includes physical vapor deposition (PVD), chemical vapor deposition (CVD), or other suitable processes. The photolithography patterning process includes photoresist coating (e.g., spin-on coating), soft baking, mask aligning, exposure, post-exposure baking, developing the photoresist, rinsing and drying (e.g., hard baking), other suitable processes and/or combinations thereof. The etching process may be a dry etching process, a wet etching process and/or another etching process (such as reactive ion etching).

Referring to FIG. 3C, after forming the sensing electrode layer 120, the insulating layer 123 is disposed over the connecting lines 122. In some embodiments, the insulating material is formed by a deposition process, and then subject to a photolithography patterning and etching processes to form the insulating layer 123.

Referring to FIG. 3C again, after forming the insulating layer 123, the first bridge parts 124a and the second bridge parts 124b are disposed over the insulating layer 123. The first bridge parts 124a are disposed in the border region 20, and the second bridge parts 124b are disposed in the visible region 10. In some embodiments, the same method for forming the bridge portions 124 is applied to the first electrodes 121X or the second electrodes 121Y.

Figure 3D:
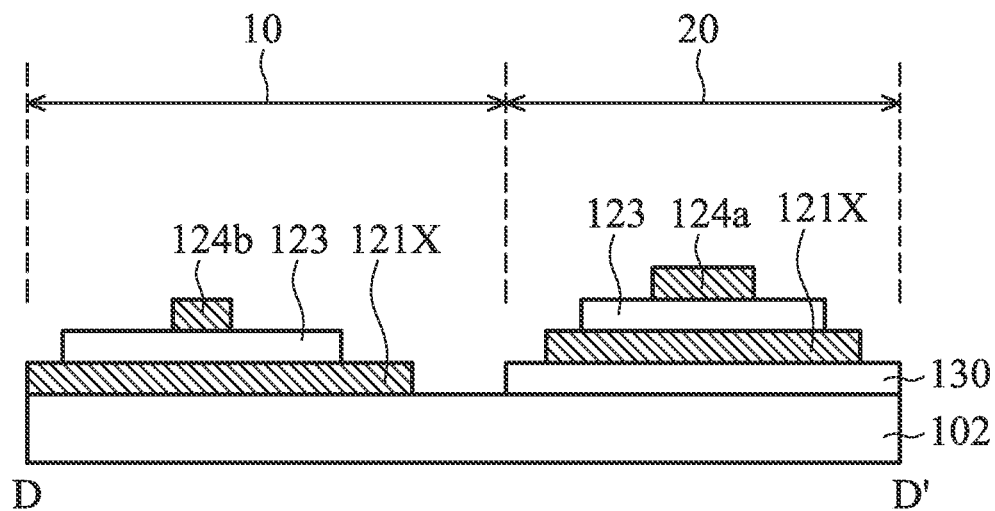
FIG. 3D shows a cross-sectional view along line D-D' of FIG. 2.

FIG. 3D shows a cross-sectional view along line D-D' of FIG. 2. It should be noted that when the first bridge parts 124a are disposed on the shielding layer 130 corresponding to the border region 20, a capacitor structure is disposed over the shielding layer 130. Because the shielding layer 130 is a quasi-conductive material (such as ink), some electrical charges may accumulate at the shielding layer 130. When the electrical charges are over-accumulated, an electrostatic discharge (ESD) may be induced, and the touch panel 100 may be further degraded. Therefore, in the disclosure, when the first bridge parts 124a are disposed over the shielding layer 130, the width of the first bridge parts 124a is adjusted to solve the electrostatic discharge (ESD) problem.

Therefore, in the disclosure, in order to solve the electrostatic discharge (ESD) problem in the border region 20, the width ratio of the first bridge parts 124a to the second bridge parts 124b is designed. The design method of the width ratio can be realized by referring to the following equations, and the effects have been experimentally proven. The width ratio of the first width W1 of the first bridge parts 124a to the second width W2 of the second bridge parts 124b is in a range from about 2 to about 5. In some embodiments, the width ratio of the first width W1 of the first bridge parts 124a to the second width W2 of the second bridge parts 124b is preferably in a range from 2 to 4. As a result, the electrostatic discharge (ESD) in the border region 20 is effectively improved.

The electrostatic discharge (ESD) is related to the power. The power is represented by equation (I). In addition, referring to equations (II) and (III), the first bridge parts 124a on the insulating layer 123 have a resistance value (R2) shown in the equation (II), and first bridge parts 124a on the second electrode pads 125Y have a resistance value (R12) shown in equation (III). The ratio of R2 to R12 (R2/R12) is obtained by calculating the equations (II) and (III).

$$P = I^2 R \qquad \text{equation (I)}$$

$$R2 = \rho\_ME/(d\_ME * W1) \qquad \text{equation (II)}$$

$$R12 = (\rho\_ME/(d\_ME * W1')) * (\rho\_ITO/(d\_ITO * W1'))/((\rho\_ME/(d\_ME * W1')) + (\rho\_ITO/(d\_ITO * W1'))) \qquad \text{equation (III)}$$

wherein:

$\rho\_ITO$; coefficient of resistance of the second electrodes 121Y;

$d\_ITO$: the thickness of the second electrodes 121Y;

$\rho\_ME$: coefficient of resistance of the first bridge parts 124a;

$d\_ME$: the thickness of the first bridge parts 124a;

W1: in the border region 20, the width of the first bridge parts 124a on the insulating layer 123; and W1': in the border region 20, the width of the first bridge parts 124a on the second electrode pads 125Y.

Figure 4A:
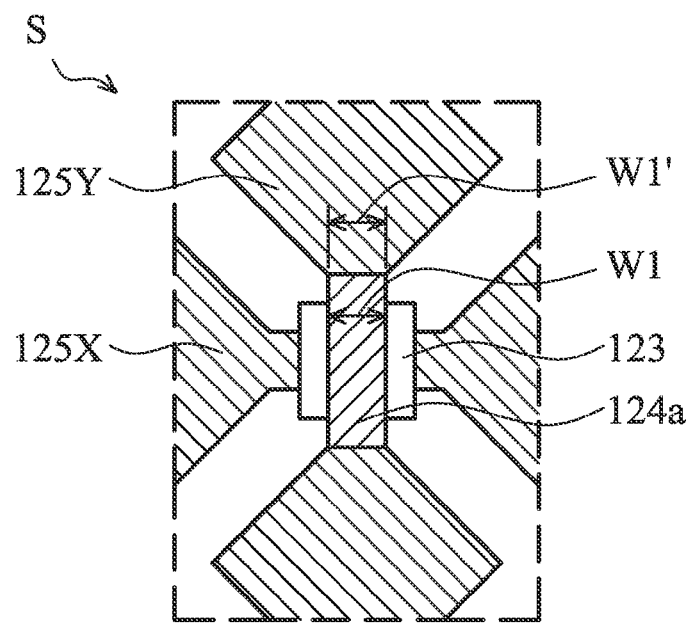
FIG. 4A shows an enlarged view of a region S of FIG. 2 in accordance with one embodiment of the disclosure.

Referring to FIG. 4A, it shows an enlarged view of a region S of FIG. 2 in accordance with one embodiment of the disclosure. The first bridge parts 124a on the second electrode pads 125Y have a width W1', and the first bridge parts 124a on the insulating layer 123 have a width W1. The first width W1' is equal to the first width W1. The widths W1 and W1' are the first widths of the first bridge parts 124a disposed above the border region 20 after widening.

Figure 4B:
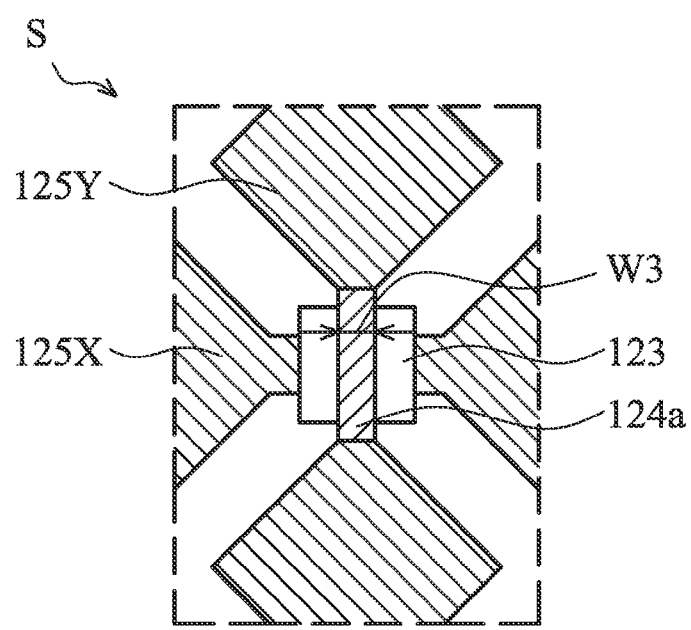
FIG. 4B shows a top-view of another embodiment of the disclosure.

FIG. 4B shows a top-view of another embodiment of the disclosure. The first bridge parts 124a disposed above the border region 20 have a third width W3, and the third width W3 is the width without widening. Therefore, the third width W3 is smaller than the first width W1. In this embodiment, the second bridge parts 124b disposed above the visible region 10 have a second width W2, and the third width W3 is equal to the second width W2. That is, in this embodiment, the first bridge parts 124a (with a width W3) disposed above the border region 20 and the second bridge parts 124b (with a width W2) disposed above the visible region 10 have the same width. (W3=W2)

Figure 5:
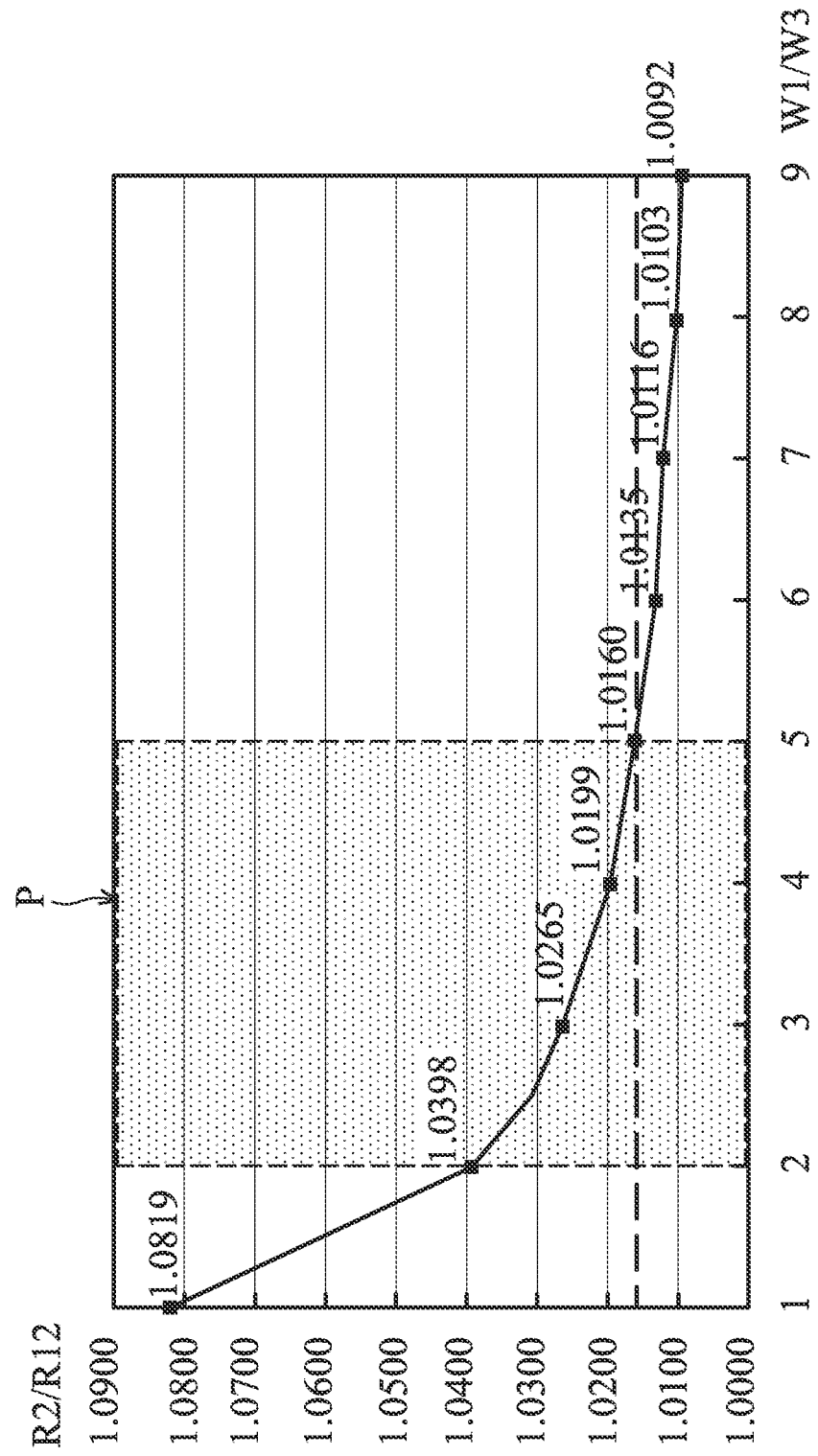
FIG. 5 shows the relationship between the width ratio and the resistance ratio of the bridge portions in accordance with one embodiment of the disclosure.

FIG. 5 shows a relationship between the width ratio and the resistance ratio (R2/R12) of the bridge portions 124 disposed above the border region 20 in accordance with one embodiment of the disclosure. Referring to FIG. 5, the X-axis represents a ratio of the first width (W1) to the third width (W3), and the Y-axis represents a ratio of R2 to R12. As shown in FIG. 5, when the ratio of the first width (W1) to the third width (W3) is in a range from about 2 to about 5, the ratio of R2 to R12 is in a range from about 1.015 to about 1.04, and the tolerance of the electrostatic discharge (ESD) voltage in the border region 20 may be in a range from about 2.5 kV to about 4 kV.

Referring back to FIG. 2, the first bridge parts 124a disposed above the border region 20 have a first width W1, and the second bridge parts 124b disposed above the visible region 10 have a second width W2. The first width W1 is greater than the second width W2. In some embodiments, the first width W1 is in a range from about 14 μm to about 35 μm, and preferably in a range from 14 μm to 20 μm. In some embodiments, the second width W2 is in a range from about 7 μm to about 10 μm. In some embodiments, a ratio of the first width (W1) to the second width (W2) is in a range from about 2 to about 5.

In accordance with some embodiments of the disclosure, when the first width W1 of the first bridge parts 124a disposed above the border region 20 is about 7 μm, and the second width W2 of the second bridge parts 124b disposed above the visible region 10 is about 7 μm, the tolerance of the electrostatic discharge (ESD) voltage in the border region 20 is about 1.5 kV. In accordance with some embodiments of the disclosure, the first width W1 of the first bridge parts 124a disposed above the border region 20 is about 14 μm, and the second width W2 of the second bridge parts 124b disposed above the visible region 10 is about 7 μm. That is, when the ratio of the first width to the second width is 2, the tolerance of the electrostatic discharge (ESD) voltage in the border region 20 is increased to about 2.5 kV.

Figure 6:
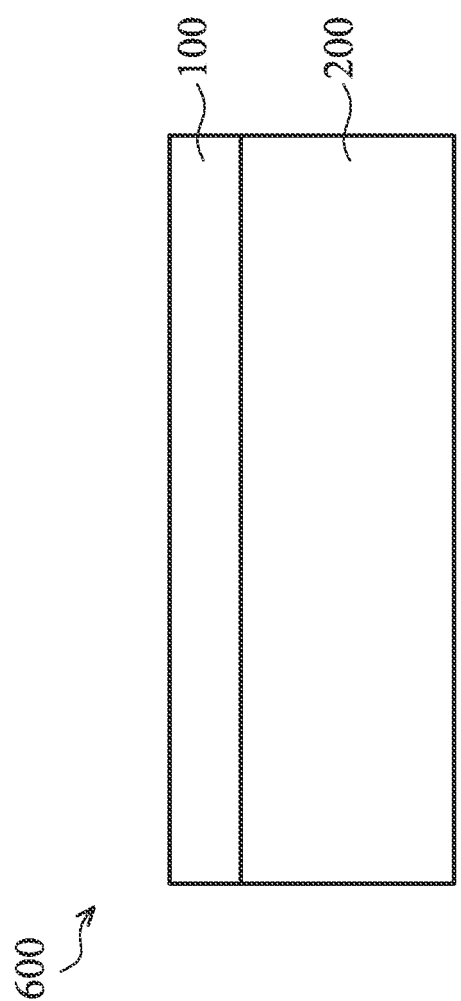
FIG. 6 shows a cross-sectional view of a touch display device in accordance with one embodiment of the disclosure.

FIG. 6 shows a cross-sectional view of a touch display device 600 in accordance with one embodiment of the disclosure. The touch display device 600 includes the touch panel 100 mentioned above and a display element 200, and the touch panel 100 is on the display element 200. The display element 200 includes a liquid crystal display or an organic light-emitting diode display. In some embodiments, the display element 200 is a liquid crystal display. The liquid crystal display includes a thin film transistor substrate and a color filter substrate disposed oppositely. The substrate of the touch panel 100 of the disclosure may also be used as the substrate of the display element 200. For example, the substrate 102 of the touch panel 100 may be a color filter substrate of the display element 200. In addition, the substrate 102 of the touch panel 100 may also be a protective substrate. The thin film transistor substrate also includes a thin film transistor structure, a pixel electrode, a scan line and a data line, etc. In some embodiments, the organic light-emitting diode display includes a cathode layer, an organic light-emitting diode layer, an anode layer, a thin film transistor layer, a bottom substrate, a top substrate, etc. The organic light-emitting diode layer includes a hole transporting layer (HTL), an emitting layer and an electron transporting layer (ETL).

Figure 7:
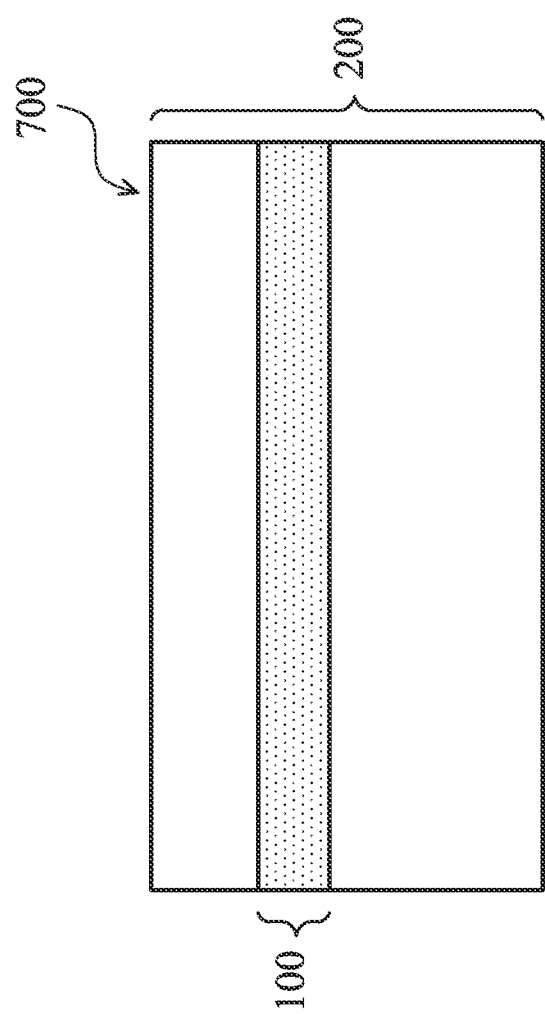
FIG. 7 shows a cross-sectional view of a touch display device in accordance with another embodiment of the disclosure.

FIG. 7 shows a cross-sectional view of a touch display device 700 in accordance with another embodiment of the disclosure. The touch display device 700 includes the above-described touch panel 100 and a display element 200, and the touch panel 100 is disposed within the display element 200. The touch panel 100 also includes a substrate which is a color filter substrate or a protective substrate. The display element 200 includes a liquid crystal display or an organic light-emitting diode display. In some embodiments, the display element 200 is a liquid crystal display. The liquid crystal display includes a thin film transistor substrate and a color filter substrate disposed oppositely. The substrate of the touch panel 100 of the disclosure may also be used as the substrate of the display element 200. For example, the substrate 102 of the touch panel 100 may be a color filter substrate of the display element 200. In addition, the substrate 102 of the touch panel 100 may also be a protective substrate.

The disclosure provides a touch panel and a touch display device. The sensing electrode layer of the touch panel extends from the visible region to the shielding layer on the border region so that both the visible region and the border region have touch functionality. As a result, the sensitivity of the touch panel is increased. In addition, the sensing electrode layer includes the first electrodes, the second electrodes and the bridge portions across the first electrodes for electrically connecting the adjacent second electrode pads. In accordance with some embodiments of the disclosure, when the ratio of the width of the bridge portions disposed above the border region and the width of the bridge portions disposed above the visible region is in a range from 2 to 5, the tolerance of the electrostatic discharge (ESD) voltage in the border region is increased. Therefore, the touch panel of this disclosure has high sensitivity and high tolerance of the electrostatic discharge (ESD) voltage in the border region because of the design of the width of the bridge portions disposed above the border region.

Although the disclosure has been described by way of example and in terms of the preferred embodiments, it should be understood that various modifications and similar arrangements (as would be apparent to those skilled in the art) can be made herein without departing from the spirit and scope of the disclosure as defined by the appended claims.

What is claimed is:

1. A touch panel, comprising:
a substrate, comprising a visible region and a border region outside the visible region;
a shielding layer disposed over the border region of the substrate; and
a sensing electrode layer disposed over the substrate, wherein the sensing electrode layer extends from the visible region to the border region,
wherein the sensing electrode layer comprises:
a plurality of first electrodes, wherein each of the first electrodes comprises a plurality of first electrode pads arranged along a first direction and electrically connected to each other;
a plurality of second electrodes, wherein each of the second electrodes comprises a plurality of second electrode pads arranged along a second direction; and
a plurality of bridge portions across the first electrodes for electrically connecting adjacent second electrode pads, wherein the bridge portions comprise:
a plurality of first bridge parts disposed above the border region; and
a plurality of second bridge parts disposed above the visible region, and having a second width, wherein a first width of the first bridge parts is greater than the second width.

2. The touch panel as claimed in claim 1, wherein a ratio of the first width to the second width is in a range from 2 to 5.

3. The touch panel as claimed in claim 1, further comprising:
an insulating layer between the first electrodes and the bridge portions.

4. The touch panel as claimed in claim 1, further comprising:
a signal wiring layer disposed over the border region, wherein the signal wiring layer comprises a plurality of signal wires, and wherein the signal wires are electrically connected to the sensing electrode layer.

5. The touch panel as claimed in claim 1, wherein a material of the first electrodes or the second electrodes comprises indium tin oxide (ITO), indium zinc oxide (IZO), cadmium tin oxide (CTO), aluminum zinc oxide (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or combinations thereof.

6. The touch panel as claimed in claim 1, wherein a material of the bridge portions comprises a conductive metal line, a transparent conductive material or combinations thereof.

7. The touch panel as claimed in claim 6, wherein the conductive metal line comprises copper (Cu), silver (Ag), aluminum (Al) or combinations thereof.

8. The touch panel as claimed in claim 6, wherein the transparent conductive material comprises indium tin oxide (ITO), indium zinc oxide (IZO), cadmium tin oxide (CTO), aluminum zinc oxide (AZO), indium tin zinc oxide (ITZO), zinc oxide, cadmium oxide (CdO), hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO) or combinations thereof.

9. A touch display device, comprising:
a display element; and
a touch panel disposed over the display element, the touch panel comprising:
a substrate, comprising a visible region and a border region outside the visible region;
a shielding layer disposed over the border region of the substrate; and
a sensing electrode layer disposed over the substrate, wherein the sensing electrode layer extends from the visible region to the border region,
wherein the sensing electrode layer comprises:
a plurality of first electrodes, wherein each of the first electrodes comprises a plurality of first electrode pads arranged along a first direction and electrically connected to each other;
a plurality of second electrodes, wherein each of the second electrodes comprises a plurality of second electrode pads arranged along a second direction; and
a plurality of bridge portions across the first electrodes for electrically connecting adjacent second electrode pads, wherein the bridge portions comprise:
a plurality of first bridge parts disposed above the border region; and a plurality of second bridge parts disposed above the visible region, and having a second width, wherein a first width of the first bridge parts is greater than the second width.

10. The touch display device as claimed in claim 9, wherein the display element comprises a liquid crystal display or organic light-emitting diode display.

11. The touch display device as claimed in claim 10, wherein the display element is a liquid crystal display and comprises a thin film transistor substrate and a color filter substrate disposed oppositely, and wherein the substrate of the touch panel is the color filter substrate.

12. The touch display device as claimed in claim 10, wherein the touch panel comprises a substrate, and the substrate is a color filter substrate or a protective substrate.

13. The touch display device as claimed in claim 9, wherein a ratio of the first width to the second width is in a range from 2 to 5.

14. A touch display device, comprising:
a display element; and
a touch panel disposed within the display element, the touch panel comprising:
a substrate, comprising a visible region and a border region outside the visible region;
a shielding layer disposed over the border region of the substrate; and
a sensing electrode layer disposed over the substrate, wherein the sensing electrode layer extends from the visible region to the border region,
wherein the sensing electrode layer comprises:
a plurality of first electrodes, wherein each of the first electrodes comprises a plurality of first electrode pads arranged along a first direction and electrically connected to each other;
a plurality of second electrodes, wherein each of the second electrodes comprises a plurality of second electrode pads arranged along a second direction; and
a plurality of bridge portions across the first electrodes for electrically connecting adjacent second electrode pads, wherein the bridge portions comprise:
a plurality of first bridge parts disposed above the border region; and
a plurality of second bridge parts disposed above the visible region, and having a second width, wherein a first width of the first bridge parts is greater than the second width.

15. The touch display device as claimed in claim 14, wherein the display element comprises a liquid crystal display or organic light-emitting diode display.

16. The touch display device as claimed in claim 15, wherein the display element is a liquid crystal display and comprises a thin film transistor substrate and a color filter substrate disposed oppositely, and wherein the substrate of the touch panel is the color filter substrate.

17. The touch display device as claimed in claim 14, wherein a ratio of the first width to the second width is in a range from 2 to 5.

* * * * *